United States Patent
Staszór

(10) Patent No.: US 10,598,147 B2
(45) Date of Patent: Mar. 24, 2020

(54) TUNNEL WIND TURBINE WITH A HORIZONTAL AXIS OF THE ROTOR ROTATION

(71) Applicant: Roman Staszór, Piotrków Trybunalski (PL)

(72) Inventor: Roman Staszór, Piotrków Trybunalski (PL)

(*) Notice: Subject to any disclaimer, the term of this patent is extended or adjusted under 35 U.S.C. 154(b) by 162 days.

(21) Appl. No.: 15/752,878

(22) PCT Filed: Aug. 24, 2016

(86) PCT No.: PCT/PL2016/000090
§ 371 (c)(1),
(2) Date: Feb. 14, 2018

(87) PCT Pub. No.: WO2017/034426
PCT Pub. Date: Mar. 2, 2017

(65) Prior Publication Data
US 2018/0258909 A1  Sep. 13, 2018

(30) Foreign Application Priority Data
Aug. 25, 2015  (PL) .......................................... 413664

(51) Int. Cl.
*F03D 1/04* (2006.01)
*F03D 13/20* (2016.01)
(Continued)

(52) U.S. Cl.
CPC ................ *F03D 1/04* (2013.01); *F03D 3/002* (2013.01); *F03D 9/25* (2016.05); *F03D 13/20* (2016.05);
(Continued)

(58) Field of Classification Search
CPC ..................................... F03D 1/04; F03D 9/25
See application file for complete search history.

(56) References Cited

U.S. PATENT DOCUMENTS

| | | | | |
|---|---|---|---|---|
| 4,548,548 A | * | 10/1985 | Gray, III | F01P 5/06 123/41.49 |
| 6,756,696 B2 | * | 6/2004 | Ohya | F03D 1/04 290/55 |

(Continued)

*Primary Examiner* — Ninh H. Nguyen
*Assistant Examiner* — Behnoush Haghighian
(74) *Attorney, Agent, or Firm* — John Alumit

(57) ABSTRACT

The turbine contains a diffuser (1) in the form of a rotational body, the wall of which has the shape of a convex-concave aeronautical profile in the axial section and a rotor (2) with blades (7) rotating in the plane of a throat ($R_t$) of the diffuser (1) and connected with a hub (3) by lower ends. The lower ends of the blades (7) are set away from the surface of the hub (3) by the dimension of the lower gap (z2), the dimension being determined by the height of connectors (8) mounted to the lower ends of the blades (7) and to the hub (3), the dimensions of the upper gap (z1) between the upper ends of the blades (7) and the surface of the throat ($R_t$) and the lower gap (z2) have dimensions ranging from 0.5 to 15% of the radius of the throat ($R_t$), preferably from 3 to 8%. The upper gap (z1) is determined by the height of the connectors (8) mounted to the upper ends of the blades (7) and to the rotational ring (9) which rotates in the circumferential recess (10) of the diffuser (1) and the inner surface of which has a shape of the throat ($R_t$). Furthermore, the ratios of the dimensions of the upper gaps (z1) and the lower gaps (z2) to the corresponding lengths of chords (c1, c2) on the ends of blade (7) of the profiles have values ranging from 0.20 to 2.5, preferably from 0.6 to 1.2.

15 Claims, 5 Drawing Sheets

Figure 1:
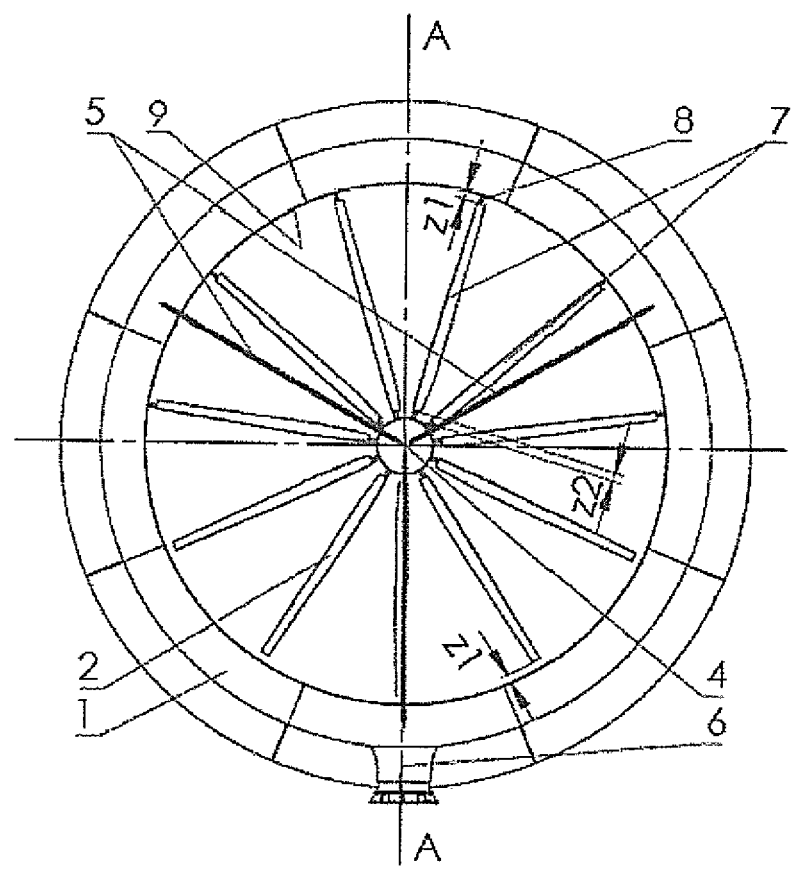

(51) Int. Cl.
*F03D 9/25* (2016.01)
*F03D 3/00* (2006.01)
(52) U.S. Cl.
CPC ....... *F05B 2240/133* (2013.01); *Y02E 10/721* (2013.01)

(56) References Cited

U.S. PATENT DOCUMENTS

| | | | | |
|---|---|---|---|---|
| 10,202,961 | B2* | 2/2019 | Keeley | F03D 1/04 |
| 2010/0247289 | A1* | 9/2010 | Presz, Jr. | F03D 1/04 |
| | | | | 415/4.3 |
| 2012/0001428 | A1* | 1/2012 | Calhoon | F03D 1/04 |
| | | | | 290/44 |
| 2012/0256424 | A1* | 10/2012 | Marin | F03D 1/04 |
| | | | | 290/55 |
| 2013/0189099 | A1* | 7/2013 | Jensen | F03D 1/04 |
| | | | | 416/1 |
| 2013/0195655 | A1* | 8/2013 | Kerner | F03D 7/0236 |
| | | | | 416/1 |
| 2014/0169937 | A1* | 6/2014 | Gysling | F03D 1/04 |
| | | | | 415/1 |
| 2014/0255151 | A1* | 9/2014 | Jensen | F03D 1/04 |
| | | | | 415/4.3 |
| 2015/0300183 | A1* | 10/2015 | Dumlupinar | F01D 5/021 |
| | | | | 415/1 |

* cited by examiner

TUNNEL WIND TURBINE WITH A HORIZONTAL AXIS OF THE ROTOR ROTATION

The subject of the invention is a single stage diffuser wind turbine with a horizontal axis of the rotor rotation, converting kinetic energy of air into rotational mechanical energy and then transformed into electric energy in a current generator.

The development of tunnel wind turbines results mainly from the elimination of losses of centrifugal kinetic energy of air and the possibility to recover it through additional increase of the speed of air flowing through a rotor built into the throat of the diffuser. There are many various solutions of single stage diffuser wind turbines with a horizontal axis of the rotor rotation, the design of which is to ensure high power coefficient from the area covered by the rotor [W/m²]. The condition is to accelerate and increase the volume of the stream of air in the throat, which requires maintaining relatively laminar air flow through the diffuser while keeping the obtuse angle as wide as possible. There are known many wind turbines with solutions employing swirls to support stabilisation of the stream of air flowing through the diffuser and to prevent detachment of the air flow from the wall in the obtuse zone at the outlet of the diffuser as well as behind the nacelle.

Due to the full use of the wind energy in the contemporary solutions of tunnel turbines, there are acceptably used small gaps between the upper ends of blades and the surface of the throat and practically gapless connection with the hub. The selection of the upper gap dimension only takes into account the assembly and installation conditions, the elongation of blades loaded with centrifugal force and the radial "runout" with the permissible wear of the hub bearing. The swirls of air generated in such small gaps—practically not exceeding 0.05% of the throat radius—have negligibly small energy and their impact on the flow of air behind the rotor in the underpressure-divergent part of the diffuser is negligibly small.

There are known solutions of tunnel turbines, presented, among others, in patent descriptions WO2009063599, WO2010005289, WO2014134032 and JP2003278635 in which there is a flange offset perpendicularly outwards behind which underpressure and circumferential swirls are formed along the edge of the flange with axes lying in the plane perpendicular to the axis of the diffuser. There is also known a solution presented in the description JP2006152854 with a rotor situated in the plane of the throat of the diffuser, the wall of which has an aeronautical profile in the cross-section. The inner surface of the wall of the diffuser, near the outlet, is perforated with numerous nozzles which are connected through channels conducted through ribs connecting the diffuser with the nacelle with a suction nozzle situated in the axis of the rear end of the nacelle. The underpressure existing behind the nacelle causes air to be sucked in through the holes of an open end zone of the diffuser, with a preferable result of near-wall layers of flowing air being sucked to the diffuser wall with an air flow stabilisation effect.

Apart from the above mentioned, there is also known a solution of a turbine presented by the patent description U.S. Pat. No. 4,720,640, containing an immobile diffuser in the form of a rotational body, the wall of which has a convex-concave shape with its nose directed towards the inflowing air. There is a rotor with blades situated in the diffuser throat plane, the blades being connected with their lower ends with a hub bearing mounted coaxially with the diffuser. The contour of the hub is consistent with an aerodynamic profile of the nacelle. The upper ends of the blades are connected with a rotational ring situated in a ring recess of the diffuser, the inner surface of the ring forming the diffuser throat zone. The description presents two possible embodiments of the turbine: with a current generator built into a ring recess of the diffuser and with an electric generator built into the nacelle and a rotor of which is driven from the side of the rotor hub.

The technical problem solved by the present invention is an increase of the efficiency of a diffuser wind turbine by intensifying the preferable impact of swirls to reduce the total resistance of flow and to increase the stream of the volume of air flowing through the turbine.

The turbine according to the present invention has, similarly as in the solutions described above, an immobile diffuser in the form of a rotating body, the wall of which has, in its axial section, the shape of a convex-concave aeronautical profile with its nose directed towards the inflowing air and which is supported on the turbine mast by the wind direction bearing set. In the diffuser throat plane there is a bearing mounted blade rotor, the blades of which are connected by their lower ends with the hub bearing mounted coaxially with the diffuser. The hub has a contour consistent with a streamlined profile of the nacelle which is connected by ribs with the diffuser. The essence of the invention consists in that the lower ends of the blades are set away from the hub surface by the dimension of the lower gap determined by the height of connectors fixed to the lower ends of the blades and to the hub. In this case, the dimensions of the upper gap, between the upper ends of the blades and the surface of the throat and the lower gap have dimensions ranging from 0.5 to 15% of the throat radius, preferably from 3 to 8%.

A solution of the turbine is preferable where the upper gap is determined by the height of the connectors fixed to the upper ends of the blades and to a rotational ring which rotates in a circumferential recess of the diffuser and the inner surface of which has the shape of a throat.

In both solutions presented above it is preferable if the ratios of the dimensions of the upper and lower gaps to the corresponding lengths of chords of the profiles on the ends of the blade have values ranging from 0.20 to 2.5, preferably from 0.6 to 1.2.

It is preferable in a turbine without a rotational ring if each of the blades is mounted to the hub by two connectors with a round cross section and which are fixed in a radial direction near endings of the profiles of the lower ends of the blades.

It is preferable in a turbine with a rotational ring if each of the blades is mounted to the rotational ring and to the hub by two connectors with a round cross section, fixed in a radial direction near endings of the profiles of the upper end and the lower end of the blades.

It is also preferable if the side of the nacelle has the shape being a mirror reflection of a section of the inner surface profile of the diffuser, the ends of the section being determined by points of intersection of the straight line parallel to the diffuser axis and the line conducted through the front point of the diffuser nose advance and the point of intersection of this line and the profile of the open part of the diffuser.

In another preferable embodiment, the ratio of the area of the axial projection of the blades on the throat plane to the active area of flow through the throat has a value ranging from 0.02 to 0.30, preferably from 0.10 to 0.15.

It is also preferable if the ratio of the inlet hole area to the active area of flow through the throat has a value ranging from 1.0 to 1.6, preferably 1.20 to 1.30 and, in reference to the outlet hole area, it has a value ranging from 0.5 to 0.9 and most preferably from 0.65 to 0.75.

The invention achieves optimum effects when specific geometrical relations of the diffuser which determine its obtuse angle are maintained. The ratio of the diffuser length to the diameter of the throat should have a value ranging from 0.3 to 1.1, preferably from 0.6 to 0.8, and in relation to the diameter of the outlet hole, a value ranging from 0.1 to 0.9, preferably 90 from 0.4 to 0.6, whereas, in relation to the diameter of the inlet hole, a value ranging from 0.2 to 1.0, preferably from 0.5 to 0.7.

In an embodiment of the turbine with a rotational ring, it is preferable if the circumferential recess is formed by a round support frame of a C-shaped cross section open in the direction of the rotor rotation axis and to which composite coatings determining the aeronautical profile of the diffuser and a lower module of the wind direction bearing set are mounted.

The electrical current generator in the embodiment of the turbine without a rotational ring is a generator built in a nacelle, the rotor of which is driven from the rotor hub while, in a turbine with a rotational ring, the current generator is built inside a support frame, fixed magnets are mounted on the external circumference of the rotational ring and induction coils are fixed to the support frame.

In a high power turbine, made according to the invention, the elements of large overall dimensions: the diffuser, its support frame, coatings of the aeronautical profile, the rotational ring and elements of the current generator are divided into circumferential sections with the maximum dimensions enabling transport in standard containers, the sections being interconnected on the place of operation into the required working shape.

The solution of the turbine according to the invention in the wall layers of the diffuser and the nacelle generates swirl structures having axes essentially parallel to the axis of the diffuser and significant energy while simultaneously minimising the swirl structures having perpendicular axes. The impact of the swirls caused by the invention produces pressure changes preventing the distraction of air jets from the surface of both the diffuser and the nacelle. The phenomena are effective when the indicated sizes of the gaps and dimensional relations are used. The flow resistances are preferably minimised by the circumferential symmetrisation of flow obtained by a mirror-like shape of the diffuser and the nacelle.

Figure 2:
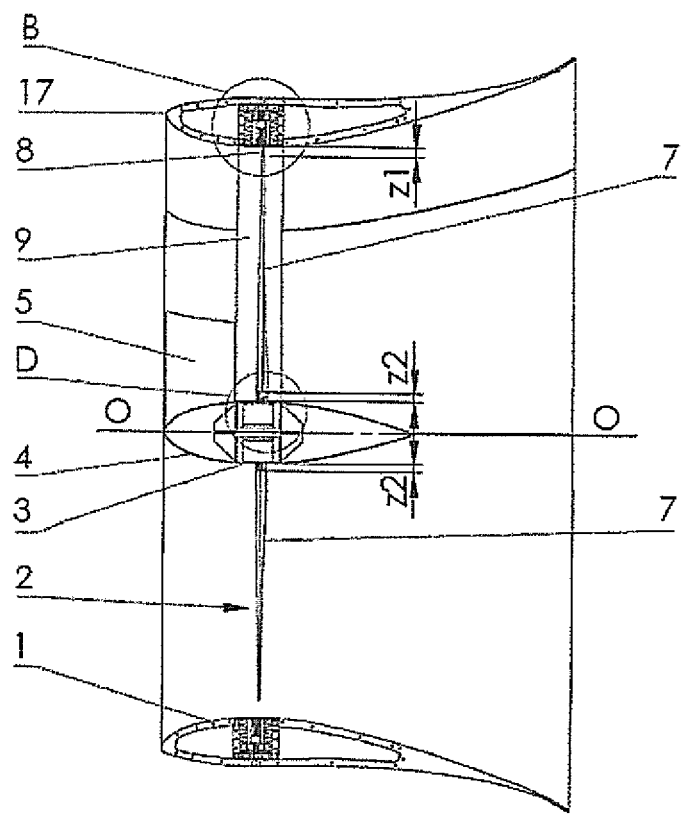
Figure 3:
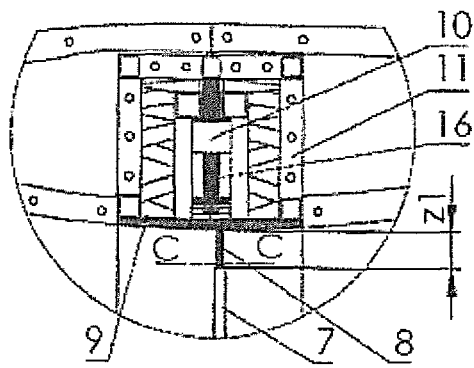
Figure 4:
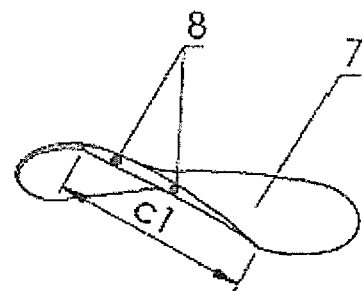
Figure 5:
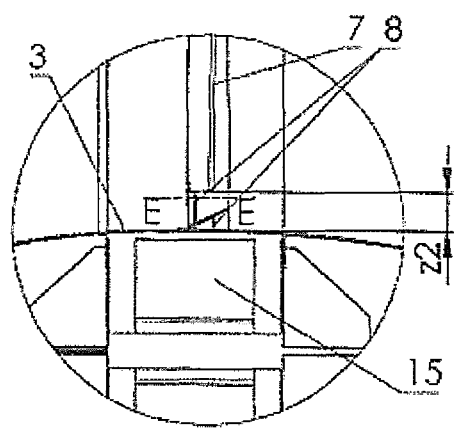
Figure 6:
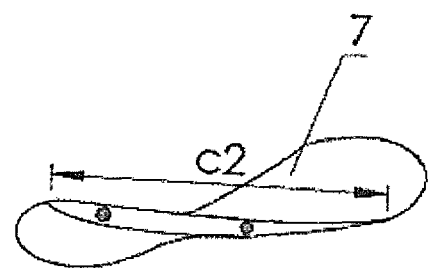
Figure 7:
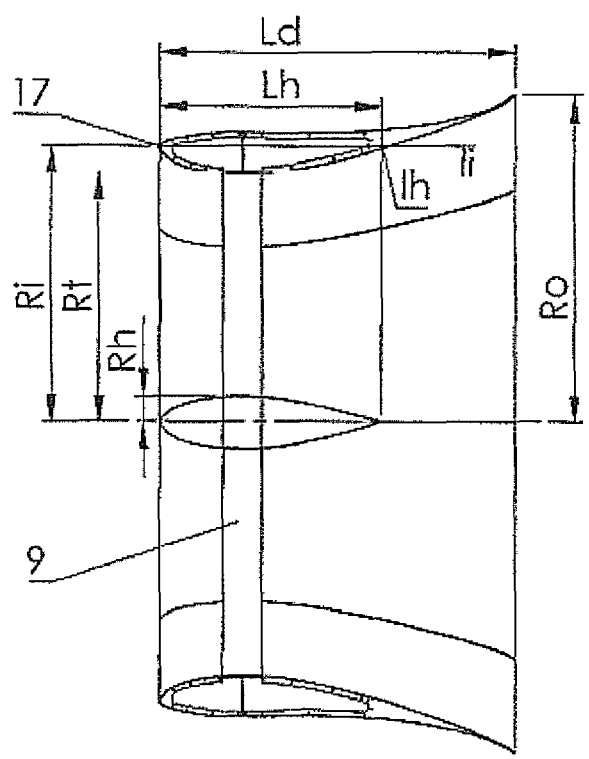
Figure 8:
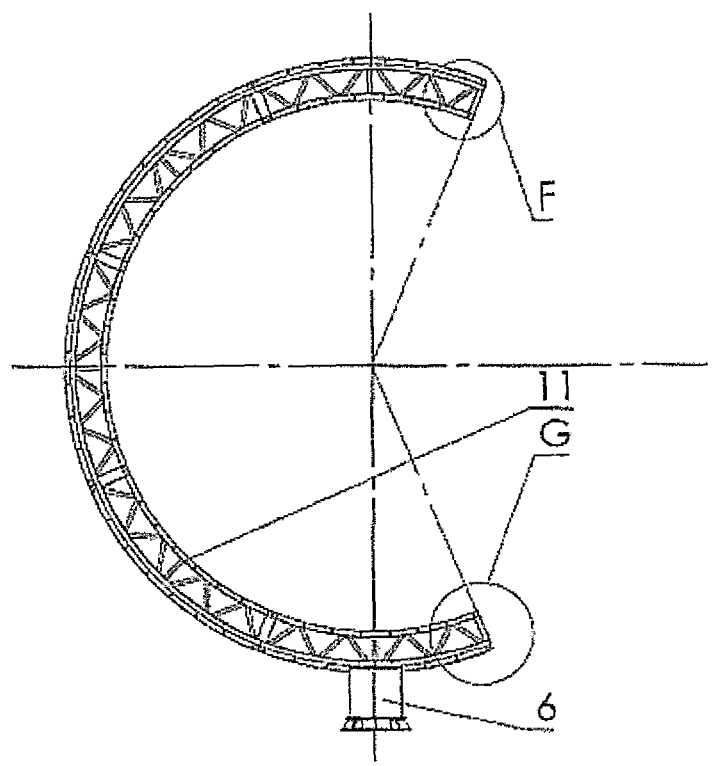
Figures 9, 10:
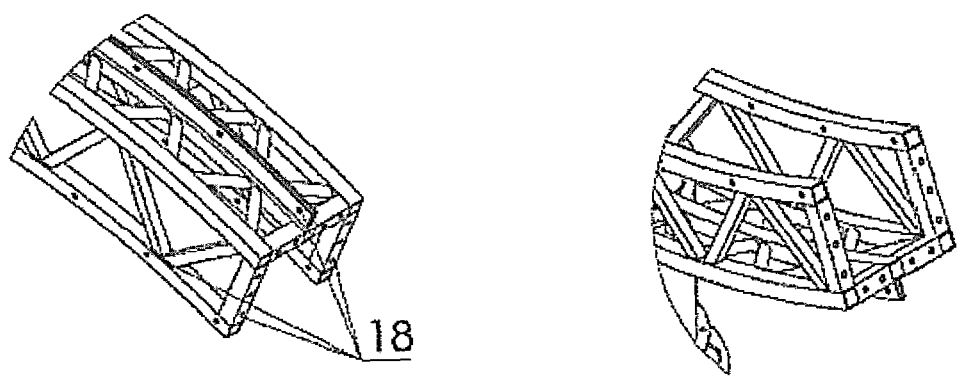
Figure 11:
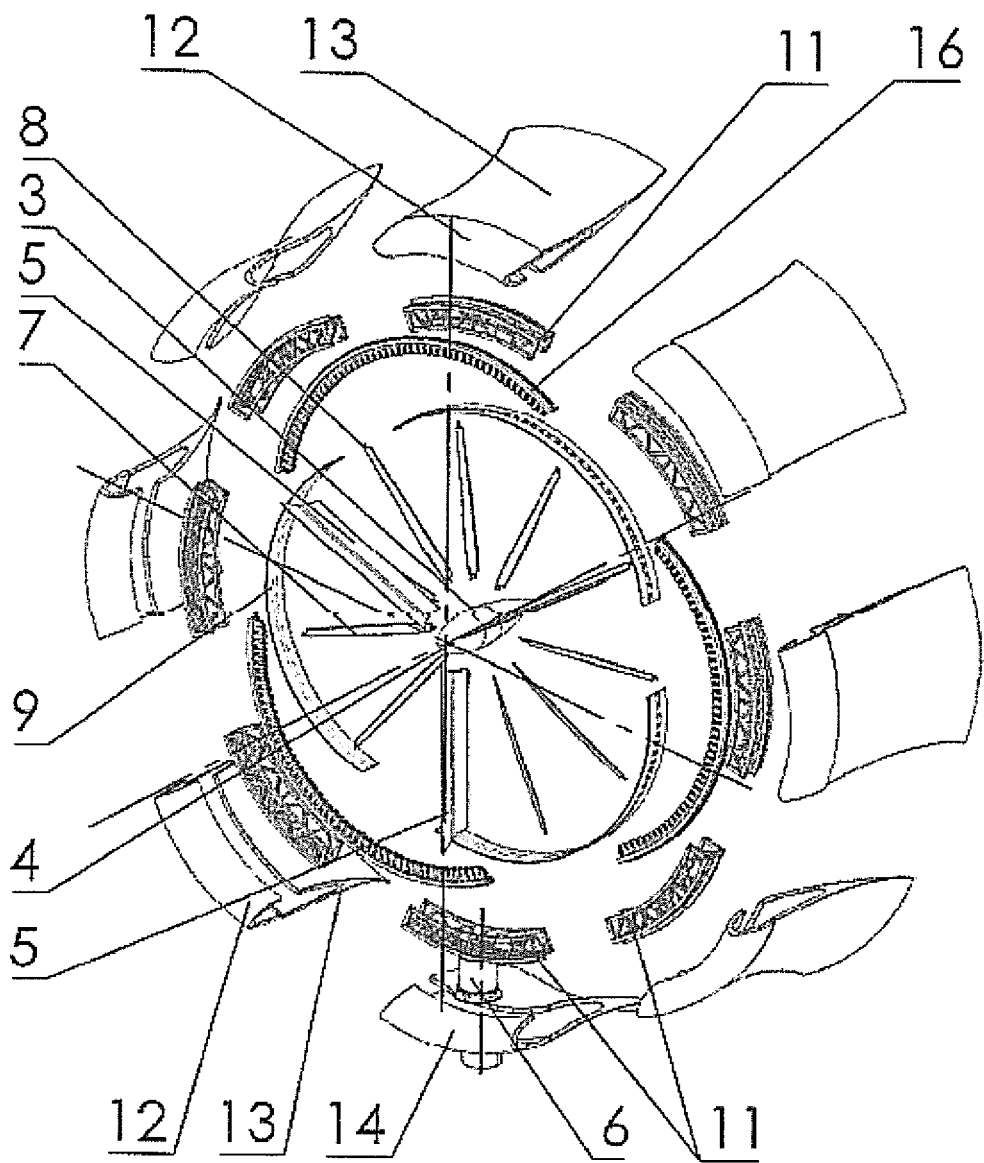
Figure 12:
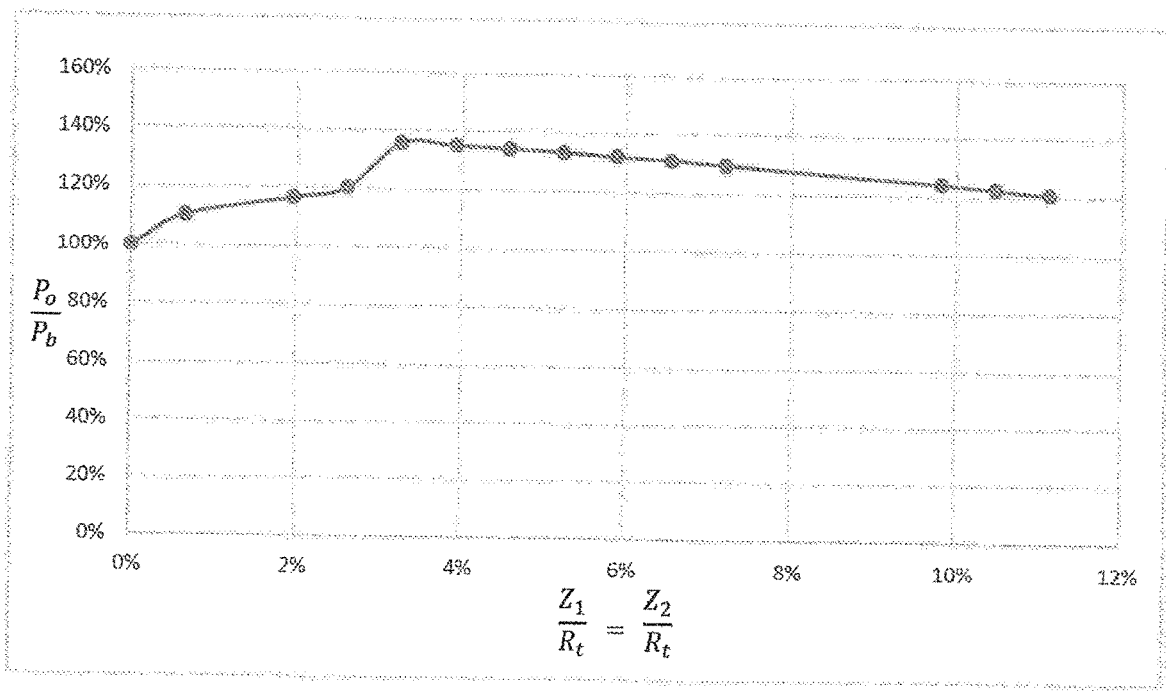
Figure 13:
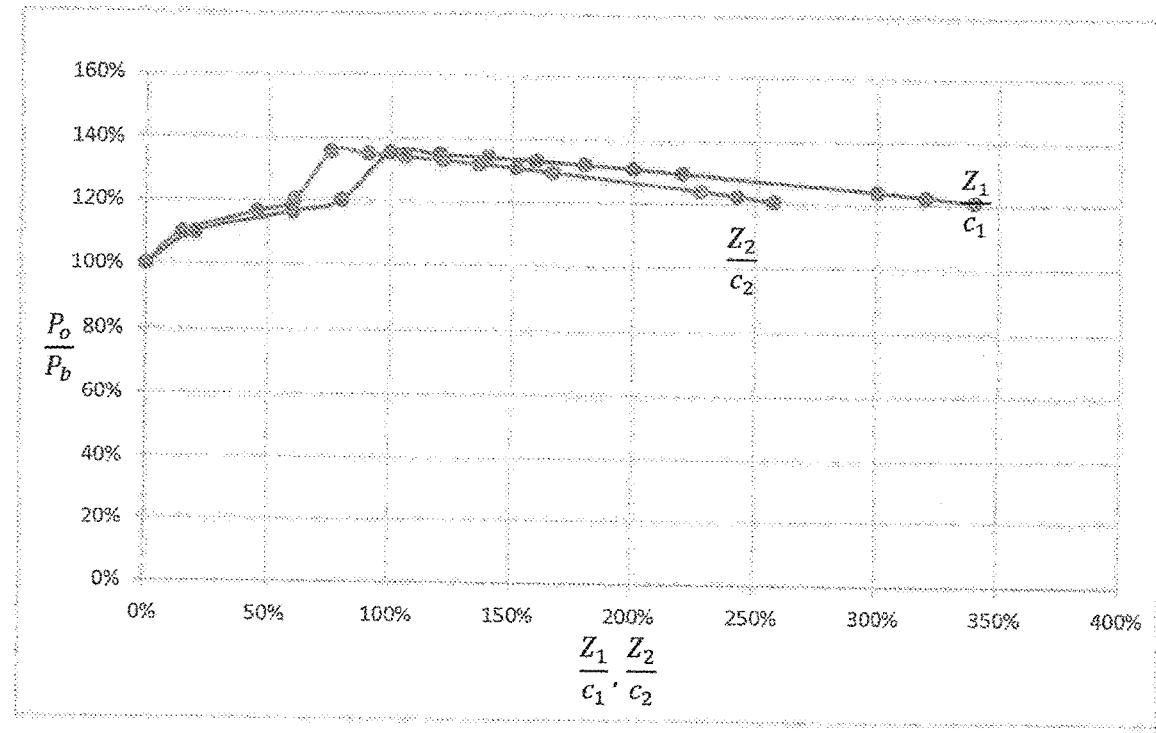

The invention will be fully comprehensible through a description of exemplary embodiments of the turbines shown on the drawing, the particular figures of which present:

FIG. 1—front view of the turbines from the air inlet side, presenting:
- on the upper half, an embodiment with the rotor blades connected on both ends by connectors with the rotational ring and with the nacelle hub, and,
- on the lower half, an embodiment with the rotor blades connected by connectors only with the hub, in an embodiment without the rotational ring, FIG. 2—axial section through the A-A line with FIG. 1, FIG. 3—detail B of the drawing in FIG. 2, FIG. 4—cross section through the C-C line with FIG. 3, FIG. 5—detail D of the drawing in FIG. 2, FIG. 6—cross section through the E-E line with FIG. 5, FIG. 7—axial section through the diffuser and the nacelle with marking of the characteristic dimensions of the diffuser, FIG. 8—front view of the turbine support frame with a rotational ring, FIG. 9—detail F of the drawing in FIG. 8, in perspective, FIG. 10—detail G of the drawing in FIG. 8, in perspective, FIG. 11—perspective "exploded" view of elements of the turbine with a rotational ring and a current generator in the diffuser, FIG. 12—graph of the impact of relative sizes of the upper gap and the lower gap on the mechanical power of the turbine according to the data obtained while testing the exemplary embodiment with a rotational ring, FIG. 13—graph of the impact of the ratio of the upper gap and the lower gap size to the corresponding lengths of chords of blade ends on the mechanical power of the turbine, the graph being made for the exemplary embodiment with a rotational ring.

The tunnel turbines according to the invention, similarly to the known solutions, have the diffuser 1 and the rotor 2 which is bearing mounted with the hub 3 in the nacelle 4 fixed coaxially by three radial ribs 5 before the throat $R_t$ of the diffuser 1. The diffuser 1 has a form of a rotational body, the wall of which has the shape of a convex-concave aeronautical profile in the axial section. The aeronautical profile of the diffuser 1 is directed with its nose towards the inflowing air. The diffuser 1 in the lower point of the external wall of the side has a seat of the bearing set 6 for the alignment of the turbine with the direction of wind, of a vertical rotation axis and with which the turbine is supported on the mast not visible in the drawing. The rotor 2, with, for example, 11 blades 7, rotates in the plane of the throat $R_t$ of the diffuser 1.

FIG. 1 presents two basic optional embodiments of the turbines according to the invention, differing by the design of the rotor 1. In the embodiment shown on the upper half of FIG. 1, the upper ends of the blades 7 are connected by spacer connectors 8 with the rotational ring 9 situated in the recess 10 of the diffuser and the inner area of which has the shape of the profile of the throat $R_t$ of the diffuser 1. On the other hand, in the embodiment according to the lower half of FIG. 1, the upper ends of the blades 7 are free. In both embodiments, the lower ends of the blades 7 are connected by spacer connectors 8 with the hub 3 having a contour consistent with the aerodynamic profile of the nacelle 4. Between the upper ends of the blades 7 and the surface of the throat $R_t$ of the diffuser 1 there exist upper gaps z1 which, in the embodiment with the rotational ring 9, are determined by the length of the connectors 8. The lower ends of the blades 7 are set away from the surface of the hub 3 by the dimension of the lower gap z2 of a length of the connectors 8 mounted to the lower ends of the blades 7 and to the hub 3. The dimensions of the upper gap z1 and the lower gap z2 can be equal or different but their values should always range from 0.5 to 15% of the radius of the throat $R_t$. For a prototype embodiment, this relation amounts to 3.2% with the typical dimensions of the turbine:

upper gap z1, lower gap z2 z1=z2=50 mm length of the chord of the upper end of the blade c1=50 mm length of the chord of the lower end of the blade c2=66 mm diffuser throat radius $R_t$=1530 mm inlet hole radius $R_i$=1700 mm outlet hole radius $R_o$=2026 mm nacelle radius $R_h$=165 mm diffuser length $L_d$=2170 mm
nacelle length $L_h$=1360 mm
surface of axial projection of 11 blades×25240 mm²=277641 mm²

The ratios of the dimensions of the upper gaps z1 and the lower gaps z2 to the corresponding lengths 7 of the chords c1 and c2 on the ends of the blade 7 of the profiles are also essential for the efficiency of the structure of swirls in the turbine according to the invention. Their values should range from 0.20 to 2.5 and in the present exemplary embodiment, where z1=z2, they amount to 7 and 1.0, respectively. In both embodiments, the blades 7 of the rotor 2 are fixed to the hub 3 through two connectors 8 of a round cross section which are fixed with their axes in a radial direction and near the endings of profiles of lower ends of the blades 7. In the embodiment with the rotational ring 9, the upper ends of the blades 7 are also connected by the same two stud connectors 8 to the rotational ring 9. The circumferential symmetrisation of flow through the diffuser 1 is also important for the invention. It has been achieved as a result of shaping the nacelle 4 according to a mirror reflection of a section of the inner surface profile of the diffuser 1, the ends of the section being determined by the points of intersection of the straight line $l_j$ parallel to the diffuser axis O-O and the line conducted through the front point of advance of the nose 17 of the diffuser and the point $l_h$ of the inner surface of the open part of the diffuser. The high efficiency of the impacts of the initiated system of swirls is achieved while maintaining proper dimensional relations which in the examined turbine amount to:

the ratio of the axial projection of the blades 7 onto the plane of the throat $R_t$ to the active area of flow through the throat $R_t$ with the nacelle choke taken into account has a value of 0.12, the ratio of the area of the inlet hole $R_i$ to the active area of flow through the throat $R_t$ has a value of 1.22, the ratio of the area of the inlet hole $R_i$ to the area of the outlet hole $R_o$ has a value of 0.7, the ratio of the length $L_d$ of the diffuser 1 to the diameter of the throat $R_t$ has a value of 0.7, the ratio of the length $L_d$ of the diffuser 1 to the diameter of the outlet hole $R_o$ has a value of 0.53, and the ratio of the length $L_d$ of the diffuser 1 to the diameter of the inlet hole $R_i$ has a value of 0.64. The obtuse angle 9° results from the dimensions of the tested diffuser 1 as being contained between the aeronautical profile chord and the diffuser axis O-O.

Furthermore, the circumferential recess 10 in the diffuser 1 for the rotational ring 9 is formed by a round support frame 11 of a C-shaped cross section open in the direction of the diffuser axis O-O and to which are mounted composite coatings, the front one 12 and the rear one 13, determining the aeronautical profile of the diffuser 1 and the lower module 14 of the bearing set 6 of the wind direction. In the embodiments of the turbine without the rotational ring 9 but also with the rotational ring 9, the current generator may be an electric generator 15 built into the nacelle 4 with the rotor driven from the hub 3 of the rotor 2. On the other hand, in the embodiment with the rotational ring 9, the current generator 16 is preferably built in the support frame 11, with fixed magnets mounted on the outer circumference of the rotational ring 9 and with the induction coils fixed to the support frame 11. An embodiment of the turbine with the current generator 16 in the diffuser 1 and the electric generator 15 in the nacelle 4 is also possible.

Due to the significant dimensions of the high power turbine and the resultant transport problems, the diffuser 1, its support frame 11, coatings 12, 13, 14 of an aeronautical profile, the rotational ring 9 and elements of the current generator 16 are divided into circumferential sections with maximum dimensions enabling transport in a standard container. In the operation location, they are assembled by being interconnected by means of fasteners 18 into the required working shape of the turbine.

The prototype turbine in the embodiment with the rotational ring 9 was tested in an aerodynamic tunnel. With the speed of wind of 5 m/s, the turbine according to the described embodiment of the invention showed a significant increase of the mechanical power PQ in relation to the power of the turbine $P_b$ having the same diffuser and rotor without the lower gap z2=0 and with a small upper gap z1=6 mm, constituting 0.39% of the radius of the throat $R_t$=1530 mm. The chart in FIG. 12 shows the increase of power. The results of the test of the impact of the ratio of dimensions of the upper gap z1 and the lower gap z2 to the corresponding lengths of the chords c1 and c2 of the ends of the blade on the increase of mechanical power are shown on the chart in FIG. 13. Both charts confirm an increase of power of the turbine with features of the invention which initiate swirls with an effect of much more stabilised and reduced air flow resistance.

To a designer who is an expert in this field, a solution of a turbine containing essential features of the present invention is obvious—that is, the dimensionally specified upper gaps z1 and lower gaps z2 generating a preferable system of swirls—the design of the turbine being complemented with a mechanism of change of the advance angle of the blades 7, the mechanism being built into the nacelle.

LIST OF FIGURE MARKINGS 1. diffuser
2. rotor
3. hub
4. nacelle
5. rib
6. bearing set
7. blade
8. connector
9. revolving ring
10. recess
11. support frame
12. front coating of profile
13. rear coating of profile
14. lower module with bearing set
15. electric generator
16. current generator
17. aeronautical profile nose
18. fastener
z1 upper gap
z2 lower gap
c1 length of the chord of the upper end of the blade
c2 length of the chord of the lower end the blade
O-O diffuser axis
Rt diffuser throat radius
Ri inlet hole radius
Rh nacelle hub radius
Ro outlet hole radius
$L_d$ diffuser length
$L_h$ nacelle length
$l_j$ straight line parallel to the diffuser axis, conducted through the front point of the noseadvance
$l_h$ point of intersection of the straight line lj and the inner surface of the diffuser profile $P_o$ mechanical power of the turbine according to the exemplary embodiment of the invention $P_b$ mechanical power of the turbine with the same diffuser with z1=6 mm and z2=0 mm

The invention claimed is:

1. A tunnel wind turbine with a horizontal axis of the rotor rotation, comprising:
    a diffuser (1) in the form of a rotating body, the wall of which has, in its axial section, the shape of a convex-concave aeronautical profile with a nose (17) whose narrower end is directed towards inflowing air and which is supported by a wind direction bearing set (6) of a vertical rotation axis on a turbine mast, and
    a rotor (2) with blades (7) rotating in the plane of a throat (R1) of the diffuser (1) and lower ends of the blades are connected with a hub (3) which is bearing mounted coaxially with the diffuser (1), the hub having a contour consistent with an aerodynamic profile of a nacelle (4), the nacelle being connected by ribs (5) with the diffuser (1), wherein the lower ends of the blades (7) are set away from the hub (3) by a dimension of a lower gap (z2), the dimension being determined by a height of connectors (8) mounted to the lower ends of the blades (7) and to the hub (3), the dimensions of an upper gap (z1) between the upper ends of the blades (7) and a surface of the throat ($R_t$), and the lower gap (z2), have a range from 0.5 to 15% of the radius of the throat ($R_t$).

2. The turbine according to claim 1 wherein the upper gap (z1) is determined by a height of the connectors (8) fixed to the upper ends of the blades (7) and to a rotational ring (9) which rotates in a circumferential recess (10) of the diffuser (1) and the inner surface of which has a shape of the throat ($R_t$).

3. The turbine according to claim 1 or 2, wherein the ratios of the dimensions of the upper gaps (z1) and the lower gaps (z2) to the corresponding lengths of chords (c1, c2) on the ends of blades (7) of profiles have values ranging from 0.20 to 2.5.

4. The turbine according to claim 1, wherein each of the blades (7) is mounted to the hub (3) by two stud connectors (8) having a round cross section and which are fixed in a radial direction toward the lower ends of the blades (7).

5. The turbine according to claim 2, wherein each of the blades (7) is mounted to the rotational ring (9) and to the hub (3) by two connectors (8) having a round cross section (d), fixed in a radial direction toward the upper end and the lower end of the blades (7).

6. The turbine according to claim 1 or 2, wherein the side wall of the nacelle (4) has a shape being a mirror reflection of a section of the inner surface profile of the diffuser (1), the ends of the section being determined by points of intersection of the straight line ($l_i$) parallel to the diffuser axis (0-0) and a line conducted through a point laterally adjacent to the nose (17) of the diffuser (1) and the point (In) of the inner surface in an open part of the diffuser (1).

7. The turbine according to claim 1 or 2, wherein the ratio of the area of the axial projection of all blades (7) on the plane of the throat ($R_t$) to an active area of flow through the throat ($R_t$) has a value ranging from 0.02 to 0.30.

8. Turbine according to claim 1 or 2, wherein the ratio of the area of an inlet hole ($R_i$) to an active area of flow through the throat ($R_t$) has a value ranging from 1.0 to 1.6.

9. Turbine according to claim 1 or 2, wherein the ratio of the area of an inlet hole ($R_i$) to the area of an outlet hole ($R_o$) has a value ranging from 0.5 to 0.9.

10. Turbine according to claim 1 or 2, wherein the ratio of the length (Ld) of the diffuser (1) to the diameter of the throat ($R_t$) has a value ranging from 0.3 to 1.1.

11. Turbine according to claim 1 or 2, wherein the ratio of the length ($L_d$) of the diffuser (1) to the diameter of an outlet hole ($R_O$) has a value ranging from 0.1 to 0.9, preferably from 0.4 to 0.6 whereas the length ($L_d$) of the diffuser (1) in relation to the diameter of the inlet hole ($R_i$) has a value ranging from 0.2 to 1.0.

12. The turbine according to claim 2, wherein the circumferential recess (10) in the diffuser (1) is formed by a round support frame (11) of a C-shaped cross section open in the direction of the diffuser (1) axis and to which there are mounted composite coatings (12, 13) determining the aeronautical profile of the diffuser (1) and the lower module (14) of the bearing set (6) of the wind direction.

13. The turbine according to claim 1 or 2, wherein it has an electric generator (15) built into the nacelle (4) and the rotor of which is driven from the hub (3) of the rotor (2).

14. The turbine according to claim 12, wherein there is a current generator (16) built within the support frame (11), with fixed magnets mounted on the outer circumference of the rotational ring (9) and with induction coils fixed to the support frame (11).

15. The turbine according to claim 1 or 2 or 14, wherein the diffuser (1), its support frame (11), coatings (12,13) of the aeronautical profile, the rotational ring (9) and elements of the current generator (16) are divided into circumferential sections for transport, the sections being assembled by being interconnected with fasteners (18) into the required working shape of the turbine.

* * * * *